United States Patent
Bin Rusayyis et al.

(10) Patent No.: US 10,934,421 B2
(45) Date of Patent: Mar. 2, 2021

(54) POLYETHYLENE COMPOSITION

(71) Applicant: SABIC GLOBAL TECHNOLOGIES B.V., Bergen op Zoom (NL)

(72) Inventors: Mohammed Abdulaziz Bin Rusayyis, Geleen (NL); Husam Allan, Geleen (NL); Abdulhameed Al-Sheneper, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 98 days.

(21) Appl. No.: 16/319,930

(22) PCT Filed: Jul. 27, 2017

(86) PCT No.: PCT/EP2017/068976
§ 371 (c)(1),
(2) Date: Jun. 14, 2019

(87) PCT Pub. No.: WO2018/019925
PCT Pub. Date: Feb. 1, 2018

(65) Prior Publication Data
US 2019/0225782 A1    Jul. 25, 2019

(30) Foreign Application Priority Data

Jul. 27, 2016 (EP) .................................... 16181449

(51) Int. Cl.
*C08L 23/06* (2006.01)
*C08F 10/02* (2006.01)

(52) U.S. Cl.
CPC .............. *C08L 23/06* (2013.01); *C08F 10/02* (2013.01); *C08F 2500/04* (2013.01); *C08F 2500/07* (2013.01); *C08F 2500/08* (2013.01); *C08F 2500/12* (2013.01); *C08L 2203/18* (2013.01); *C08L 2203/202* (2013.01); *C08L 2205/025* (2013.01); *C08L 2207/062* (2013.01); *C08L 2207/066* (2013.01)

(58) Field of Classification Search
CPC .............. C08L 23/06; C08L 2207/066; C08L 2203/18; C08L 2207/062; C08L 2203/202; C08L 2205/025; C08F 10/02; C08F 2500/07; C08F 2500/12; C08F 2500/04; C08F 2500/08
See application file for complete search history.

(56) References Cited

U.S. PATENT DOCUMENTS

| 5,358,991 | A | 10/1994 | O'Brien | |
|---|---|---|---|---|
| 2004/0249083 | A1* | 12/2004 | Maziers | .............. C08F 297/083 525/240 |
| 2014/0377577 | A1 | 12/2014 | Lee et al. | |

FOREIGN PATENT DOCUMENTS

| WO | 2011129956 A1 | 10/2011 |
|---|---|---|
| WO | 2014099360 A1 | 6/2014 |

OTHER PUBLICATIONS

International Search Report for International Application No. PCT/EP2017/068976, International Filing Date Jul. 27, 2017, dated Oct. 20, 2017, 3 pages.
Written Opinion for International Application No. PCT/EP2017/068976, International Filing Date Jul. 27, 2017, dated Oct. 20, 2017, 7 Pages.

* cited by examiner

*Primary Examiner* — Nathan M Nutter
(74) *Attorney, Agent, or Firm* — Cantor Colburn LLP

(57) ABSTRACT

The present invention concerns a polyethylene composition comprising a blend of between 5 and 40 wt/% of first polyethylene produced with a chromium based catalyst and having an MFR2 between 0.01 and 1 g/10 min, wherein the first polyethylene is a high density polyethylene with a density between 940 and 965 kg/m3, and between 60 and 95 wt % of a second polyethylene with an MFR2 between >1 and 12 g/10 min. Such a blend may thereby be advantageously used especially for example in cable and wire applications.

19 Claims, 1 Drawing Sheet

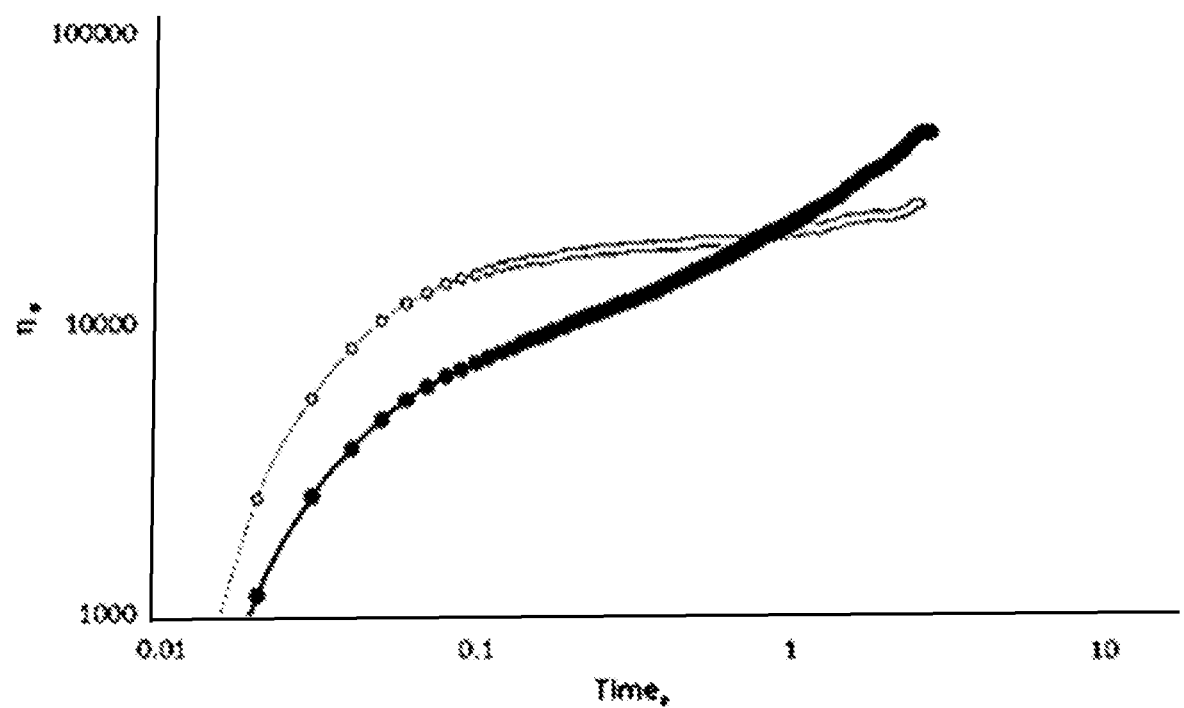

POLYETHYLENE COMPOSITION

CROSS REFERENCE TO RELATED APPLICATIONS

This application is a 371 of International Application No. PCT/EP2017/068976, filed Jul. 27, 2017, which is incorporated herein by reference in its entirety, and which claims priority to EP Application Serial No. 16181449.6, filed Jul. 27, 2016.

BACKGROUND

Polyethylene is widely used for example cable and wire insulation and jacketing because of its low dielectric loss, high dielectric strength, chemical inertness and low moisture up-take. Wire and cable insulation and jacketing are produced by extruding polyethylene through a cross-head die which delivers molten polymer onto the conductor for insulation and/or jacketing.

Lower density polyethylene is thereby especially preferred for applications requiring high flexibility. However, processing for example through extrusion of such polyethylene, especially lower density polyethylene and/or LLDPE may usually be harder. On the other hand, higher density polyethylene may contribute to structural strength.

Polymer blends are thereby already known for cable and wire applications for example from U.S. Pat. No. 5,358,991, which discloses a blend of high density polyethylene, low density polyethylene, very low density polyethylene and polypropylene.

Nonetheless, the complexity of the blends as well as achieving a high flexibility and a good processability may still be an issues with such blends, especially for demanding applications.

Therefore there is ongoing a need for a relatively simple polyethylene composition that may allow for example for good mechanical properties like high flexibility, good stiffness and good processability, especially suitable for cable and wire applications.

SUMMARY

The present invention therefore provides a polyethylene composition comprising a blend of between 5 and 40 wt/% of first polyethylene produced with a chromium catalyst and having an MFR2 between 0.01 and 1 g/10 min, wherein the first polyethylene is a high density polyethylene with a density between 940 and 965 kg/m$^3$, and between 60 and 95 wt % of second polyethylene with a density between 910 and 930 kg/m$^3$ and an MFR2 between 0.5 and 12 g/10 min.

Such a composition may be advantageously used especially in cable and wire applications providing good mechanical properties like for example high flexibility, good stiffness and good processability, especially for example in insulation and/or jacketing applications. The composition may also be used in blow molding and/or pipe and tube applications.

BRIEF DESCRIPTION OF THE DRAWING

The FIGURE is a graph of extensional viscosity (n$_e$, Pa.s) as a function of time (s) for a composition of the invention and a composition of a comparative example.

DETAILED DESCRIPTION

A chromium based catalyst according to the invention may for example be chromium oxide catalyst (also known as phillips catalysts), silyl chromate catalyst or any other chromium based catalyst.

The first polyethylene according to the invention may preferably be for example a high density polyethylene and/or a unimodal polyethylene. The second polyethylene according to the invention may preferably be for example a linear low density polyethylene and/or a unimodal polyethylene. Preferably, the composition according to the invention does not comprise any further polyethylene and/or polyolefin besides the first and the second polyethylenes. A polyethylene in the sense of the present invention may thereby be an ethylene homopolymer or copolymer, especially for example also a copolymer with one or more other α-olefins, especially for example 1-butene.

The blend according to the invention may for example be a melt blend, which may especially be obtained through extrusion of the first and second polyethylenes.

The second polyethylene and/or the linear low density polyethylene (LLDPE) used in the present invention may thereby have a density for example between 910 and 935 kg/m$^3$, preferably between 912 and 930 kg/m$^3$, further preferred between 914 and 927 kg/m$^3$, further preferred between 915 and 925 kg/m$^3$, further preferred between >915 and <925 or <920 kg/m$^3$ as determined for example according to ASTM D 1505 or ISO1183.

The first polyethylene and/or the high density polyethylene (HDPE) used in the present invention may thereby have a density for example between 940 and 965 kg/m$^3$, further preferred between 945 and 960 kg/m$^3$, further preferred between 946 and 957 kg/m$^3$, further preferred between >945 or >947 and <955 kg/m$^3$ as determined for example according to ASTM D 1505 or ISO1183.

The second polyethylene and/or the linear low density polyethylene (LLDPE) used in the present invention may thereby have a melt flow rate at 190° C. with a 2.16 kg load (MFR2) measured according to for example ASTM D 1238 or ISO1133 for example between 0.5 and 7 g/10 min, preferably between 1 and 5 g/10 min, further preferred between 1.5 and 4 g/10 min, further preferred between 2 and 3.5 g/10 min, further preferred between >2 or >2.5 and <3.5 g/10 min.

The first polyethylene and/or the high density polyethylene (HDPE) used in the present invention may thereby have a melt flow rate at 190° C. with a 2.16 kg (MFR2) load measured according to for example ASTM D 1238 or ISO1133 for example between 0.01 and 0.4 g/10 min, preferably between 0.02 and 0.3 g/10 min, further preferred between 0.025 and 0.2 g/10 min, further preferred between 0.03 and 0.1 g/10 min, further preferred between >0.03 and <0.1 g/10 min.

The first polyethylene and/or the high density polyethylene (HDPE) used in the present invention is produced using a chromium based catalyst. This may lead to a relatively broad molecular weight distribution and/or some branching, especially for example long chain branching, which in turn may each or both contribute to improve processability, especially through extrusion particularly when compared to the processability of LLDPE prepared with a Ziegler-Natta or a metallocene catalyst or of low density polyethylene prepared via free radical polymerisation. This may especially allow to improve for example melt strength, so as to contribute to better processability. This may also contribute to improve environmental stress cracking resistance (ESCR).

The polyethylene composition according to the invention may comprise blend of between 5 and 40 wt/%, preferably between 10 and 35 wt. %, further preferred between 15 or 20 and 30 wt. %, of a first polyethylene and/or a high density polyethylene produced with a chromium based catalyst with a density between 937 and 970 kg/m$^3$ and an MFR2 between 0.01 and 0.4 g/10 min and between 60 and 95 wt. %, preferably between 65 and 90 wt. %, further preferred between 70 and 80 wt. % of a second polyethylene and/or a linear low density polyethylene with a density between 910 and 935 kg/m$^3$ and an MFR2 between 1 and 7 g/10 min.

The polydispersity index (PDI=$M_w/M_n$) of the first polyethylene and/or the high density polyethylene used in the invention may preferably be higher than the polydispersity index of the second polyethylene and/or linear low density polyethylene used in the invention. This may also contribute to improve processability. The polydispersity index may thereby be calculated based on $M_w$ and $M_n$ as determined by gel permeation chromatography (GPC) for the respective polyethylenes with suitable solvents that readily dissolve the polymers.

The polydispersity index (PDI=$M_w/M_n$) of the first polyethylene and/or high density polyethylene used in the invention may for example be between 10 and 30, especially between 10 and 20, further preferred between 11 and 17 and/or between 12 and 27, further preferred between >11 and 15 and/or between 13 and 25 or 22.

The polydispersity index (PDI=$M_w/M_n$) of the second polyethylene and/or linear low density polyethylene used in the invention may for example be between 1 and 8, especially between 2 and 7, further preferred between 2.5 and 5.5, further preferred between >3 and <5.

The ratio of the PDI of the first polyethylene and/or the HDPE over the PDI of the second polyethylene and/or the LLDPE ($PDI_1/PDI_2$ or $PDI_{HDPE}/PDI_{LLDPE}$) may thereby be for example between 2 and 15, preferably between 2.5 and 7.5, preferably between 2.7 and 6.5, further preferred between 2.8 and 6, further preferred between 3 and 6, further preferred between 3 and 5.5, further preferred between 3 and 5, further preferred between 3 and 4.

Average molecular weights (Mw and/or Mn) and the polydispersity index (PDI) can be determined for example using a Waters Alliance GPC 2000 gel permeation chromatograph (GPC) with four Agilent, PLgel Olexis, PL1110-6400, 300×7.5 mm columns at 160° C. using 1,2,4-trichlorobenzene as the solvent, whereby a refractive index detector and/or the Empower software may be used. As calibration a universal calibration by using fixed Mark-Houwink k and a values through 10 narrow polystyrene standards may be used.

The linear low density polyethylene used in the present invention may preferably be produce with a Ziegler-Natty or metallocene or post-metallocene catalyst or any other similar catalyst, preferably however not a chromium based catalyst.

The polyethylene composition according to the invention may be used advantageously in cable and wire application, especially in jacketing and/or insulation applications for cables and wires. The polyethylene composition according to the invention may also be uses advantageously in blow molding as well as pipe and tube applications. The present invention thus also concerns the use of the polyethylene composition according to the present invention for cable and wire applications or blow molding or pipe and tube applications, especially for jacketing and/or insulation applications for cables and wires.

The present invention thereby allow for good flexibility, structural strength and processibility especially for example for demanding applications.

EXAMPLES

A composition according to the present invention was prepared by blending of 24.90 wt % of a first polyethylene produced with a chromium based and having an MFR2 between 0.01 and 1 g/10 min, namely a HDPE with an MFR2 of 0.05 g/10 min and a density of 952 kg/m$^3$ as well as a PDI of 13, with 74.72 wt % of a second polyethylene with an MFR2 between >1 and 12 g/10 min, namely an LLDPE with an MFR2 of 2.8 g/10 min and a density of 928 kg/m$^3$ as well as a PDI of 4.3, by mixing the two polyethylenes with 0.13 wt % of pentaerythritol tetrakis(3-(3,5-di-tert-butyl-4-hydroxyphenyl)propionate) (also known as Irganox 1010) and 0.13 wt % of tris(2,4-di-tert.-butylphenyl)phosphite (also known as Irgafos 168) as well as 0.12 wt % of zinc stearate in a Henschel mixer. The mixed powders were then pelletized with an underwater pelletizer using the Kobe LCM50 extruder (L/D=8, Screw diameter=50 mm) at a temperature between 180-225° C.

The composition according to the invention as prepared above was compared to a comparative composition were the first polyethylene is replaced by more of the second polyethylene to reach 100 wt % (comparative example). For avoidance of doubt, the comparative example does not comprise any first polyethylene produced with a chromium based and having an MFR2 between 0.01 and 1 g/10 min.

The composition were analyzed using an ARES Rheometer (TA Instruments) model 400401.901 at a temperature of 150° C. and extension rate of 1 s$^{-1}$ under identical conditions to measure extensional viscosity ($\eta_e$, Pa·s) as a function of time (s).

One can thereby see from the recorded data (The figure) that for the composition according to the invention (darker curve) extensional viscosity increases further at higher extensional times (beyond 0.1 s), especially also for extensional times beyond 1 s, compared to the composition according to the comparative example (lighter curve), where extensional viscosity stays rather flat beyond 0.1 s.

This indicates the composition according to the present invention, although it comprises just a minor amount of between 5 and 40 wt/% of the first polyethylene, may surprisingly show a significantly different rheological behavior, especially for example a significantly improved melt strength, which may in turn for example contribute to achieve a better processability. This may preferably further be combined to good mechanical properties, especially for example a suitable stiffness, provided by a composition according to the invention.

This could possibly for example be related to the long chain branches present in the first polyethylene produced with a chromium based catalyst and/or to the higher PDI of the first polyethylene produced with a chromium based catalyst and/or the density of the first polyethylene.

An improvement of processability was further confirmed by using a composition according to the invention for cable and wire applications, especially for jacketing applications, whereby an excellent processability was observed.

The invention claimed is:

1. A polyethylene composition comprising a blend of
   between 5 and 40 wt/% of a first polyethylene produced with a chromium based catalyst and having an MFR2 between 0.01 and 1 g/10 min, wherein the first polyethylene is a high density polyethylene with a density between 940 and 965 kg/m³, and
   between 60 and 95 wt % of a second polyethylene with an MFR2 between >1 and 12 g/10 min,
   wherein the first polyethylene and/or the high density polyethylene has a polydispersity index between 10 and 30; and the polydispersity index is a ratio of Mw relative to Mn.

2. A polyethylene composition according to claim 1, wherein the first polyethylene is a unimodal polyethylene and/or wherein the second polyethylene is a linear low density polyethylene and/or a unimodal polyethylene.

3. A polyethylene composition according to claim 1, wherein the second polyethylene and/or the linear low density polyethylene has a density between 910 and 935 kg/m³.

4. A polyethylene composition according to claim 1, wherein the first polyethylene and/or high density polyethylene has a density between 946 and 957 kg/m³.

5. A polyethylene composition according to claim 1, wherein the second polyethylene and/or the linear low density polyethylene has a MFR2 between >1 and 12 g/10 min.

6. A polyethylene composition according to claim 1, wherein the first polyethylene and/or the high density polyethylene has a MFR2 between 0.01 and 1 g/10 min.

7. A polyethylene composition according to claim 1, wherein the blend comprises between 10 and 35 wt. %, of the first polyethylene and/or of high density polyethylene.

8. A polyethylene composition according to claim 1, wherein the blend comprises between 65 and 90 wt. %, of the second polyethylene and/or linear low density polyethylene.

9. A polyethylene composition according to claim 1, wherein the polydispersity index of the first polyethylene and/or the high density polyethylene is higher than the polydispersity index of the second polyethylene and/or the linear low density polyethylene.

10. A polyethylene composition according to claim 1, wherein the polydispersity index of the second polyethylene and/or the linear low density polyethylene is between 1 and 8.

11. A polyethylene composition according to claim 1, wherein the ratio of the polydispersity index of the first polyethylene and/or the high density polyethylene over the polydispersity index of the second polyethylene and/or the linear low density polyethylene is between 2 and 15.

12. An article comprising a polyethylene composition, wherein the polyethylene composition comprising a blend of
    between 5 and 40 wt/% of a first polyethylene produced with a chromium based catalyst and having an MFR2 between 0.01 and 1 g/10 min, wherein the first polyethylene is a high density polyethylene with a density between 940 and 965 kg/m³, and
    between 60 and 95 wt % of a second polyethylene with an MFR2 between >1 and 12 g/10 min, and
    wherein the polyethylene composition is in the form of a jacket and/or insulation.

13. An article according to claim 12, wherein the polydispersity index of the first polyethylene and/or the high density polyethylene is between 10 and 30.

14. The polyethylene composition according to claim 2, wherein the second polyethylene and/or the linear low density polyethylene has a density between 910 and 935 kg/m³.

15. The polyethylene composition according to claim 1, wherein the first polyethylene and/or high density polyethylene has a density between 946 and 957 kg/m³, and wherein the second polyethylene and/or the linear low density polyethylene has a density between 915 and 925 kg/m³.

16. A polyethylene composition according to claim 1, wherein the second polyethylene and/or the linear low density polyethylene has a MFR2 between 2 and 3.5 g/10 min.

17. A polyethylene composition according to claim 1, wherein the first polyethylene and/or the high density polyethylene has a MFR2 between 0.03 and 0.1 g/10 min.

18. A polyethylene composition according to claim 1, wherein the blend comprises between 20 and 30 wt. %, of the first polyethylene and/or of high density polyethylene, and between 70 and 80 wt. %, of the second polyethylene and/or linear low density polyethylene.

19. A polyethylene composition according to claim 1,
    wherein the polydispersity index of the second polyethylene and/or the linear low density polyethylene is between 2.5 and 5.5,
    wherein the second polyethylene and/or the linear low density polyethylene has a MFR2 between 2 and 3.5 g/10 min, and
    wherein the ratio of the polydispersity index of the first polyethylene and/or the high density polyethylene over the polydispersity index of the second polyethylene and/or the linear low density polyethylene is between 2.8 and 6.

* * * * *